United States Patent [19]

Graetzel

[11] Patent Number: 5,205,940
[45] Date of Patent: Apr. 27, 1993

[54] IRON (III) SALT-CATALYZED OXIDATION OF WASTE WATER

[75] Inventor: Michael Graetzel, St. Sulpice, Switzerland

[73] Assignee: EMS-Inventa AG, Switzerland

[21] Appl. No.: 749,973

[22] Filed: Aug. 26, 1991

[30] Foreign Application Priority Data

Aug. 24, 1990 [DE] Fed. Rep. of Germany ....... 4026831

[51] Int. Cl.$^5$ ............................................. C02F 1/72
[52] U.S. Cl. .................................... 210/748; 210/763
[58] Field of Search ............... 210/748, 759, 762, 763, 210/908, 909

[56] References Cited

U.S. PATENT DOCUMENTS

| | | | |
|---|---|---|---|
| 4,604,214 | 8/1986 | Carr et al. | 210/759 |
| 4,624,792 | 11/1986 | Yamanaka et al. | 210/759 |
| 4,693,833 | 9/1987 | Toshikuni et al. | 210/759 |
| 4,737,315 | 4/1988 | Suzuki et al. | 210/759 |
| 4,792,407 | 12/1988 | Zeff et al. | 210/759 |
| 4,861,484 | 8/1989 | Lichtin et al. | 210/759 |
| 5,043,080 | 8/1991 | Carter et al. | 210/759 |

FOREIGN PATENT DOCUMENTS 5201665 7/1975 Japan .

OTHER PUBLICATIONS

Matthews, "Solar-Electric Water . . . as a Stationary Phase", pp. 405 et seq.

*Primary Examiner*—Stanley S. Silverman
*Assistant Examiner*—Neil M. McCarthy
*Attorney, Agent, or Firm*—Jordan B. Bierman

[57] ABSTRACT

A process for catalytic oxidation of organic materials in waste water by hydrogen peroxide in the presence of iron (III) salts at temperatures below 80° in the presence of titanium dioxide and with exposure to light.

12 Claims, 4 Drawing Sheets

IRON (III) SALT-CATALYZED OXIDATION OF WASTE WATER

This Application claims the priority of German Application 40 26 831.4, filed Aug. 24, 1990.

The invention relates to an iron (III) salt-catalyzed process for the degradation of organic materials by hydrogen peroxide in waste water, and has particular application to the organic components of industrial waste water.

BACKGROUND OF THE INVENTION

There are many processes which yield waste water containing organic components. It is desirable that these components be removed and, according to the state of the art, heavy metals or certain iron salts and peroxide have been used for this purpose. However, when these materials are used, the degradation of the organic components is incomplete to a substantial extent. Moreover, the products of such degradation are flocculated or flocculatable, as described in DE 29 27 911 and 26 41 094. In addition, DE 27 29 760 discloses the photocatalytic effect of titanium and silicon dioxides, as well as zinc oxide, without any particular mention of iron compounds.

Thus, there is a need for a process that improves the degradation of the organic components of waste water so that the residual components are minimized or eliminated. Important considerations are the time required, the yield obtained, and the effectiveness of carbonization of the components, i.e. the substantial conversion thereof into volatile degradation products.

SUMMARY OF THE INVENTION

The present invention is directed to a process for the catalytic oxidation of a blend of organic components and water which comprises the introduction into the blend of titanium dioxide, hydrogen peroxide, and at least one iron (III) salt.

DETAILED DESCRIPTION OF THE INVENTION

The preferred iron salt is ferric sulfate and is desirably used in an amount of $0.1 \times 10^{-3}$ to 1.0 mols of salt per liter of blend. More preferably, the amount is $0.1 \times 10^{-2}$ to $0.1 \times 10^{-1}$ mols per liter of blend. Advantageously, the temperature at which the oxidation reaction is carried out is 20° to 75° C., preferably 45° to 60° C.

The hydrogen peroxide is present in an amount which does not exceed 0.5 mols of peroxide per liter of the reaction mixture; preferably, this amount does not exceed 0.3 mols per liter of reaction mixture. It has also been found particularly useful to introduce the hydrogen peroxide stepwise in portions, especially portions approximating 0.1 mols per liter of the mixture.

Titanium dioxide is also present in the reaction mixture and adds to the oxidation process. It has been found advantageous to limit the titanium dioxide to 10 g per liter of the reaction mixture.

In the accompanying drawings, constituting a part hereof, and in which like reference characters indicate like parts, FIG. 1 is a graph showing the degradation of waste water from the production of nitro-ortho-xylol(NOX) in accordance with Example 2 of the present invention;

Figure 1:
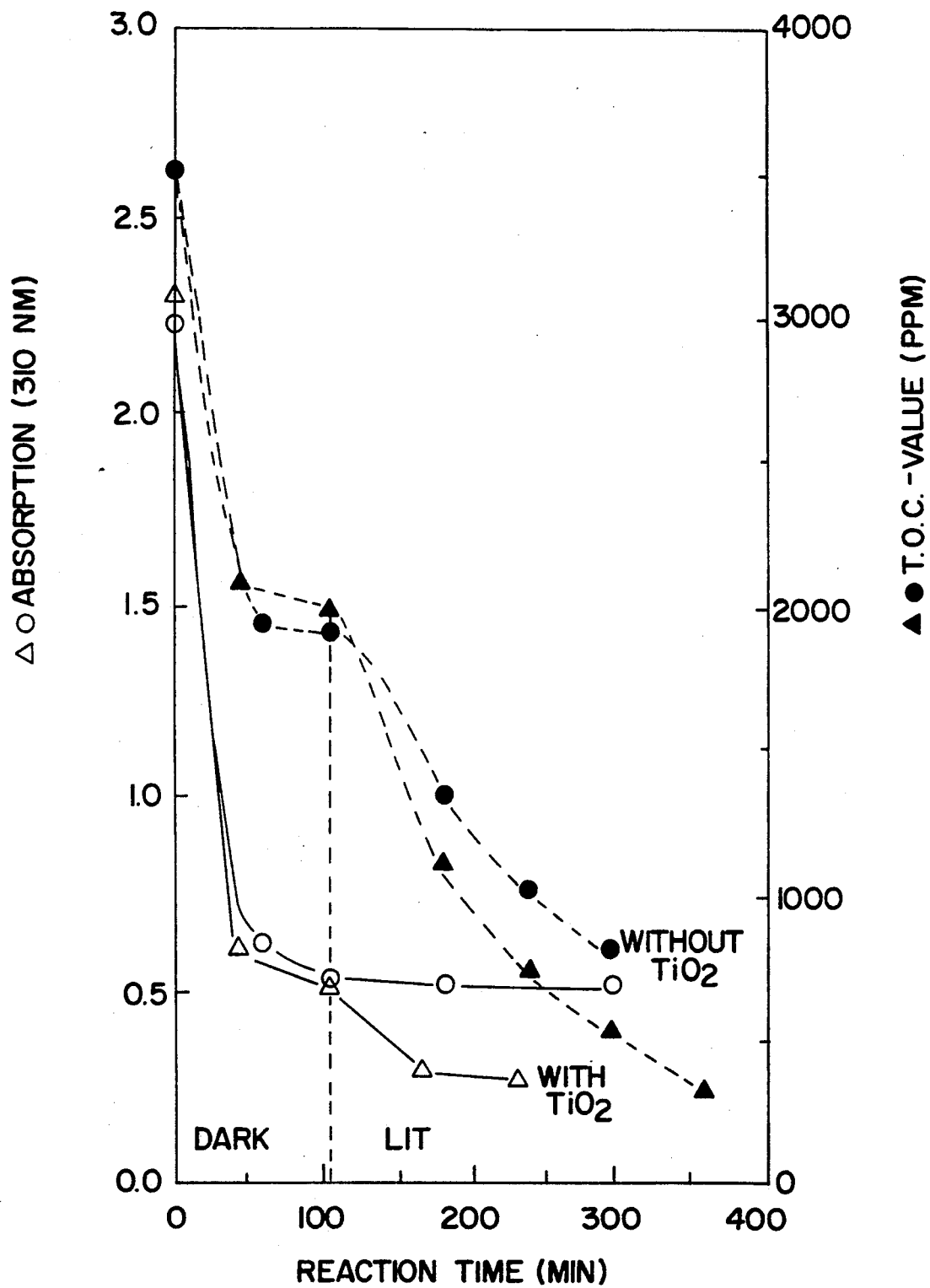
Figure 2:
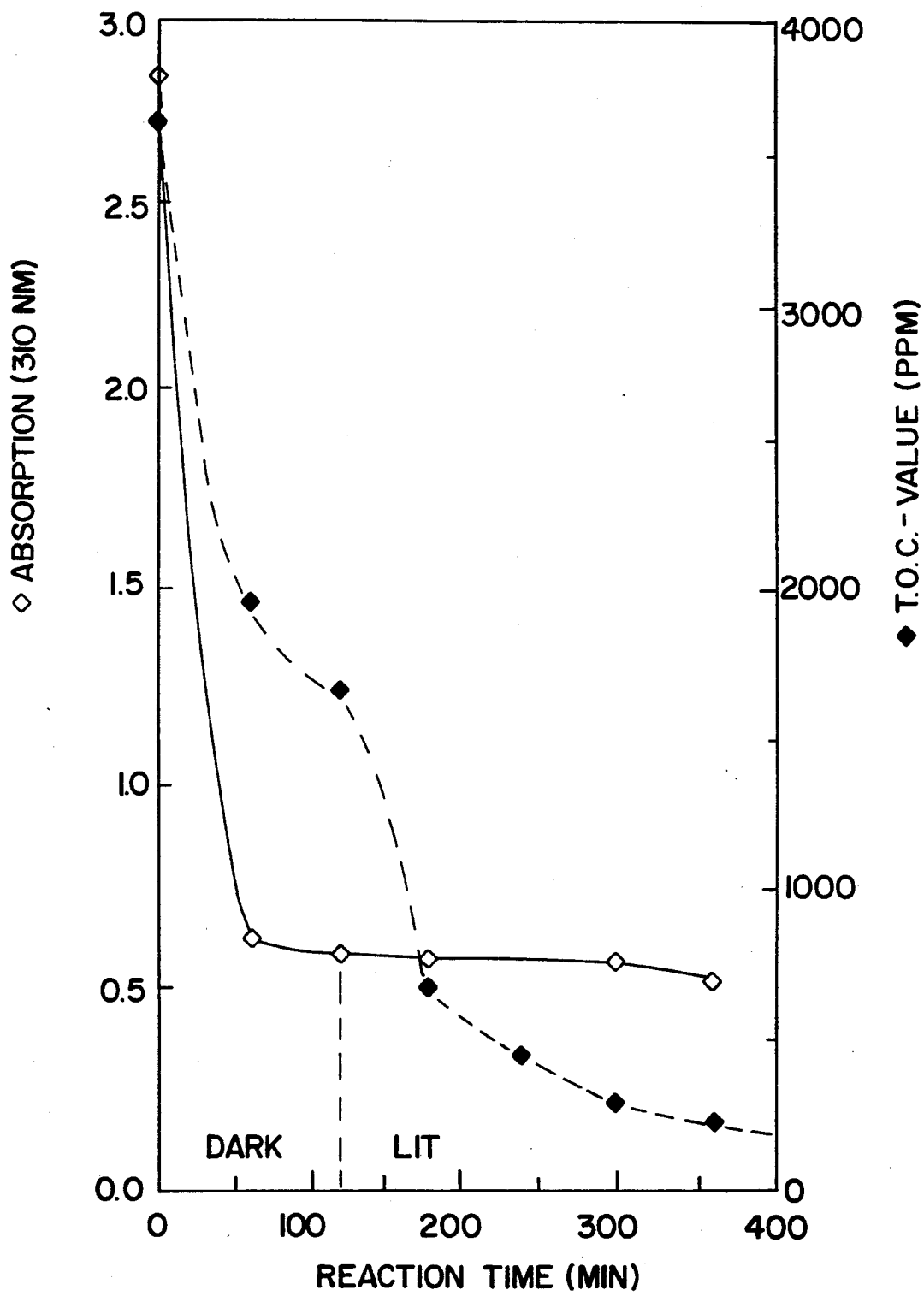
FIG. 2 is a graph showing a variation of the reaction of FIG. 1 according to Example 3 of the present invention.
Figure 3:
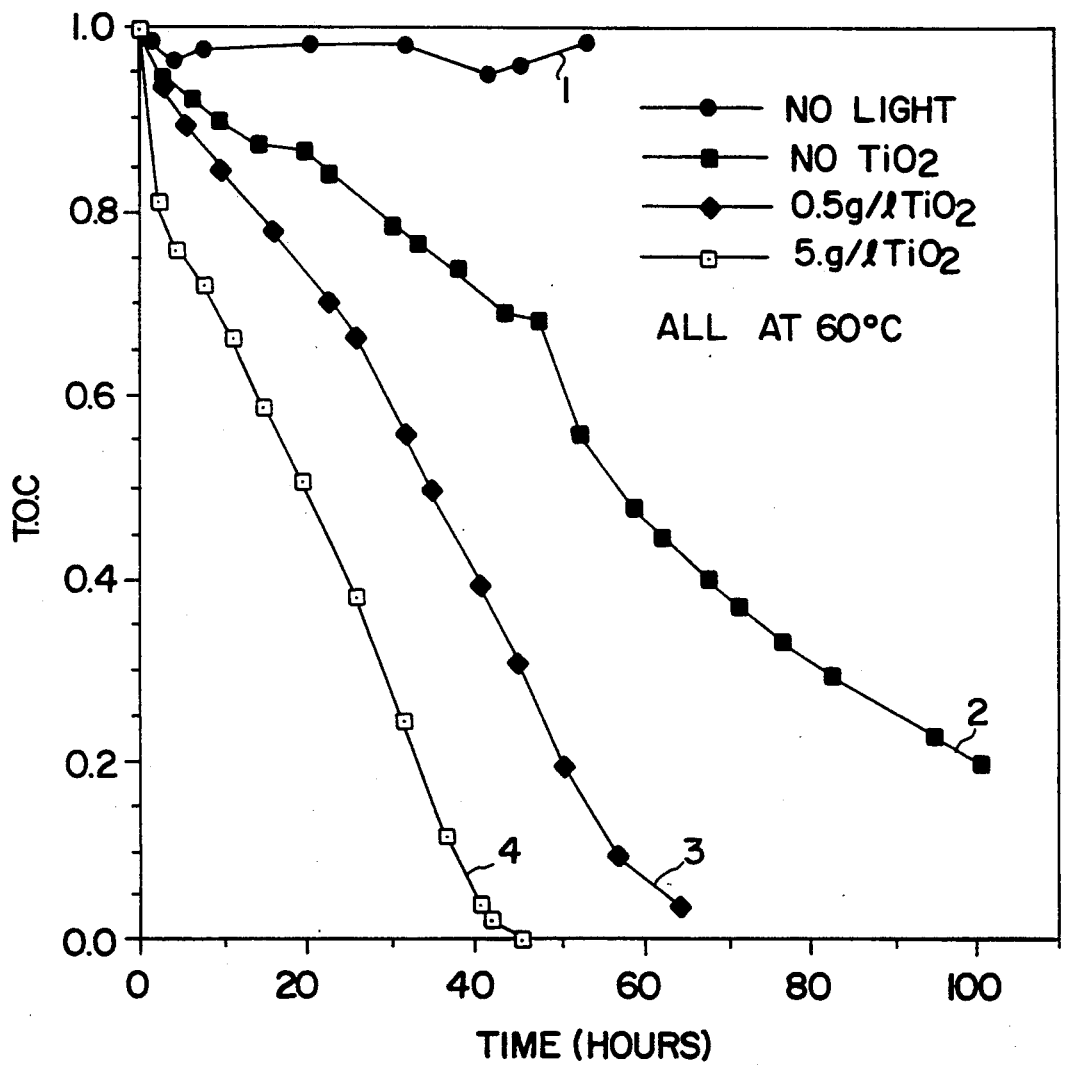
FIG. 3 is a graph showing degradations of impurities according to four prior art reactions.
Figure 4:
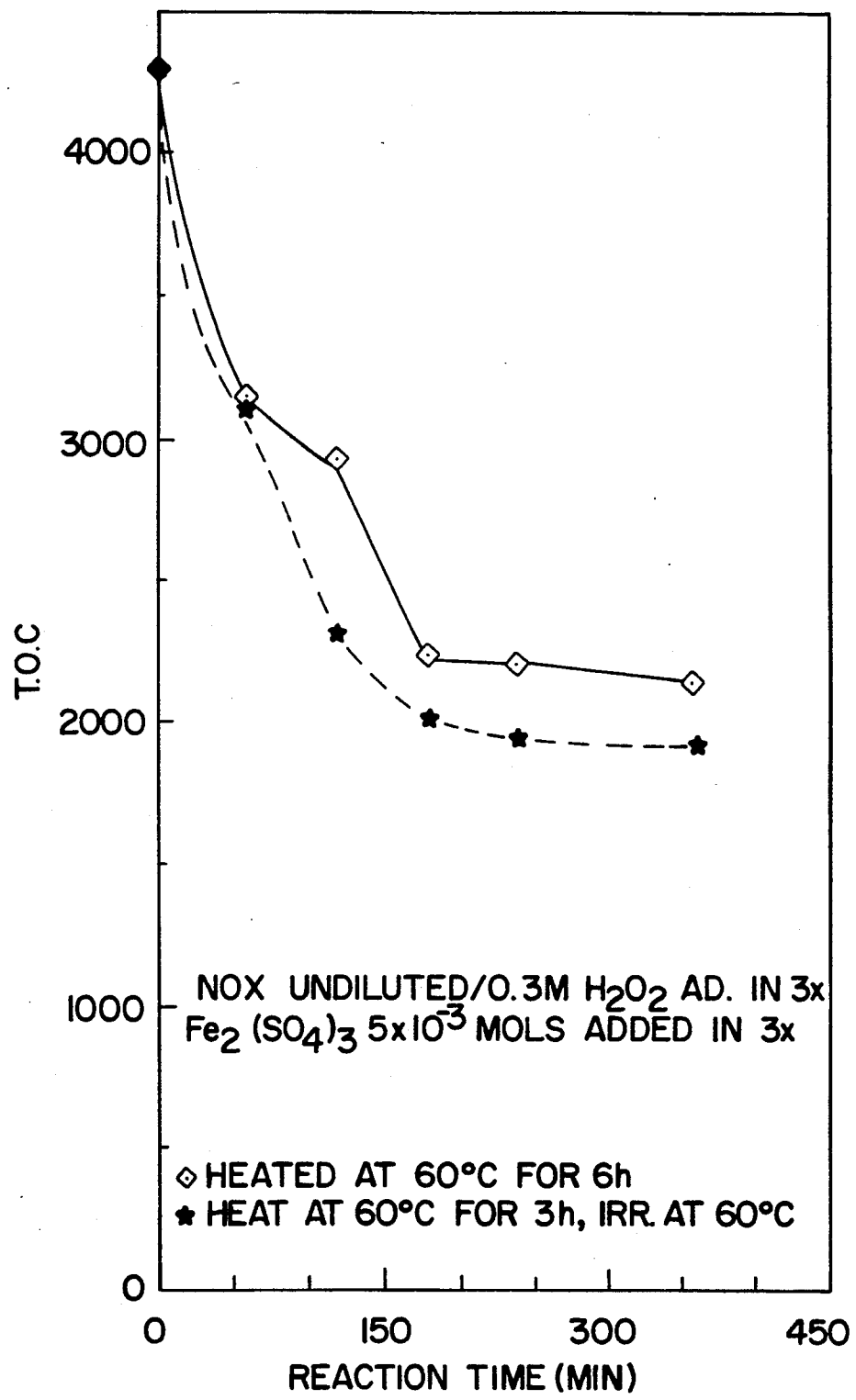
FIG. 4 is a graph showing degradation of impurities by means of ferric sulfate and hydrogen peroxide.

In FIGS. 1, 2, and 4, the organic components being removed are determined in terms of total organic carbon (TOC) in mg/liter or ppm plotted against reaction time in minutes. In FIG. 3, TOC in terms of fractions of the starting level is plotted against reaction time in hours. As a source of light in all cases, a 100 watt xenon-mercury lamp was used.

The "Absorption (310 nm)" refers to the absorption or extinction of 310 nm light by the solution. The extinction (or optical density) is related to the concentration of light absorbing material (c) and the optical pathlength of the light (l) by Lambert Beers' law, i.e. $OD = \epsilon l c$, where $\epsilon$ is the decimal extinction coefficient.

COMPARATIVE EXAMPLE 1

Thermal degradation of pollutants in undiluted waste water.

Chemical waste water from the preparation of nitro-ortho-xylol (NOX) is used as a typical starting material. The test was carried out at 50° C. and the reduction in the amount of organic impurities over time was determined by calculation of the TOC value. Ferric sulfate, in an amount of $5 \times 10^{-3}$ mols per liter was introduced into the solution along with 0.1 mol per liter of hydrogen peroxide. An additional 0.1 mol per liter of hydrogen peroxide was added stepwise after the first and again after the second hour of reaction time. This brought the total hydrogen peroxide to 0.3 mols per liter of solution.

At the end of two hours, the ferric sulfate and the hydrogen peroxide (only 0.2 mols per liter had been added up to this point) had reduced the TOC from 3500 ppm to 1300 ppm. In another comparative test, identical to the foregoing in all respects except that the iron salt was omitted, the TOC was reduced by less than 10% in the same time period.

EXAMPLE 2

Combination of thermal and photocatalytic processes.

Referring more particularly to FIG. 1, the reactions depicted were carried out first in the dark for 120 minutes and then with exposure to light. During the first phase (dark) of the reactions, 0.3 mols of hydrogen peroxide and $5 \times 10^{-3}$ mols per liter of ferric sulfate were added in three portions. The reactions were carried out at 70° C. During the dark phase, it can be seen that the total organic carbon (TOC), which is a measure of the amount of organic component present, fell from about 3500 to 2000 ppm within approximately 50 minutes.

The second hour of the dark reaction brought about little change. At this point, in two of the reactions (identified by open and closed triangles), 10 g/liter of titanium dioxide was added and the reaction mixtures exposed to light. The other reactions (open and closed circles), were carried out with exposure to light but in the absence of titanium dioxide. After 5 hours (300 minutes), the difference in TOC (and hence organic components) is readily observable. The reaction with titanium dioxide present brought the TOC down to approximately 300 or less, while the same reaction in the absence of titanium dioxide reduced the TOC only to about 700 to 800. After exposure to light for about 4 hours the reaction with titanium dioxide (the present invention) brought the TOC down to approximately one tenth of its initial value.

EXAMPLE 3

This test was carried out in the same manner as Example 2 except that, in addition to the 0.3 mols/liter of $H_2O_2$, 0.1 mol/liter is added at the beginning of the light phase (120 minutes).

In this case, 0.3 mols of hydrogen peroxide, $5 \times 10^{-3}$ mols of ferric sulfate, and 10 g/liter of titanium dioxide powder were all introduced into the water and organic components at the beginning of the reaction during the dark phase.

Thereafter, the reaction mixture was exposed to light and the amount of degradation achieved was to a TOC value of about 120 ppm after a relatively short exposure time. In other words, during the first 3 hours, the total organic carbon fell to about 20%, during the next 3 hours it fell less than 4%, based on the original TOC context.

FIG. 3 is a graph showing a comparison of various prior art processes. The starting organic carbon level is used as a reference and assigned a value of 1.0. The remaining TOC values are based thereon and proportional thereto.

Curve 1 shows the change in TOC in the absence of any additives except for 5 g/l of $TiO_2$ and without exposure to light. In curve 2, there are no additives, but the reaction mixture is irradiated by the aforementioned 100 watt xenon-mercury lamp. Titanium dioxide, in an amount of 0.5 grams per liter, is added to produce curve 3 and this amount is increased to 5.0 grams per liter to form the basis of curve 4. It has also been found that, even if the titanium dioxide is increased to 10.0 grams per liter, no appreciable difference results.

Thus, a comparison of FIG. 1 with FIGS. 3 and 4 indicates the synergistic nature of the present invention. FIG. 3 shows that, in the absence of Fe (III) salt and hydrogen peroxide, it takes over 40 hours for the titanium dioxide (acting with light) to reach the TOC level which is attained by the present invention (solid diamond curve) in about 6 hours. A comparison of FIGS. 1 and 3 is also instructive. The present invention reduced the TOC content to about 25% in only 4 hours. Titanium dioxide with light (and no ferric salt or hydrogen peroxide) required approximately 30 hours to reach the same level.

The results of further comparisons are shown in FIG. 4. In these comparisons, ferric sulfate and hydrogen peroxide are used in the presence of light. Titanium dioxide is omitted. As can be seen from FIG. 4, the TOC level was reduced, even after 6 hours, only to slightly less than ½ of its initial value. The combination of the present invention reduced this to a maximum of about 10% of the initial value in the same period of time.

Thus, the presence of ferric sulfate, titanium dioxide, and hydrogen peroxide greatly and synergistically accelerates the degradation of organic components in aqueous solutions. It is possible to purify waste water resulting from the production of NOX thoroughly by heat under very mild conditions.

While only a limited number of specific embodiments of the present invention have been expressly disclosed, it is, nonetheless, to be broadly construed and not to be limited except by the character of the claims appended hereto.

I claim:

1. A process for catalytic oxidation of a blend of organic components and water, said process comprising introducing into said blend $TiO_2$, hydrogen peroxide, and at least one Fe (III) salt to form a reaction mixture and exposing said reaction mixture to light at a reaction temperature below 80° C.

2. The process of claim 1 wherein said iron salt is ferric sulfate.

3. The process of claim 1 wherein said iron salt is in an iron amount of $0.1 \times 10^{-3}$ to 1.0 mols per liter of said blend.

4. The process of claim 3 wherein said iron amount is $0.1 \times 10^{-2}$ to $0.1 \times 10^{-1}$ mols per liter of said blend.

5. The process of claim 1 wherein said reaction temperature is 20° to 75° C.

6. The process of claim 5 wherein said reaction temperature is 45° to 60° C.

7. The process of claim 1 wherein said hydrogen peroxide is present in an oxidation amount of a maximum of 0.5 moles per liter of said reaction mixture.

8. The process of claim 7 wherein said oxidation amount is 0.3 moles per liter.

9. The process of claim 1 wherein said hydrogen peroxide is introduced into said reaction mixture stepwise in portions.

10. The process of claim 9 wherein each of said portions is about 0.1 mols of said hydrogen peroxide per liter of said reaction mixture.

11. The process of claim 1 wherein a maximum of 10 g per liter of titanium dioxide is introduced into said reaction mixture.

12. The process of claim 1 wherein said iron salt is ferric sulfate, said reaction temperature is 20° to 75° C., and said hydrogen peroxide is added to said reaction mixture stepwise in portions.

* * * * *